United States Patent [19]

Eto et al.

[11] Patent Number: 4,802,192

[45] Date of Patent: Jan. 31, 1989

[54] CIRCUIT FOR DETECTING SYNCHRONIZING CODE

[75] Inventors: Yoshizumi Eto, Sagamihara; Kazuyuki Takeshita, Hachiouji; Hidehiro Kanada, Kodaira; Masuo Umemoto, Tokyo, all of Japan

[73] Assignees: Hitachi, Ltd.; Hitachi Denshi Kabushiki Kaisha, Tokyo, Japan

[21] Appl. No.: 13,114

[22] Filed: Feb. 10, 1987

[30] Foreign Application Priority Data

Feb. 14, 1986 [JP] Japan ................... 61-28828

[51] Int. Cl.$^4$ ............................................. H04L 7/00
[52] U.S. Cl. ...................................... 375/116; 370/106; 340/825.2
[58] Field of Search ............... 375/106, 111, 112, 114, 375/116; 370/105, 106; 328/63, 75; 340/825.2, 825.14

[56] References Cited

U.S. PATENT DOCUMENTS

| 3,555,195 | 1/1971 | Rester | 375/116 |
| 3,928,726 | 12/1975 | Colton et al. | 370/105 |
| 4,370,648 | 1/1983 | Wagner | 370/105 |
| 4,414,677 | 11/1983 | Ive et al. | 375/116 |
| 4,727,558 | 2/1988 | Hall | 375/116 |

Primary Examiner—Robert L. Griffin
Assistant Examiner—Stephen Chin
Attorney, Agent, or Firm—Antonelli, Terry & Wands

[57] ABSTRACT

An original code series containing a synchronizing code is divided into code series, n in number so as to reduce an operation rate to 1/n (n is a positive integer). The detection of a synchronizing pattern is conducted on the basis of a fact that an original synchronizing pattern is transformed into any of patterns of n kinds based on the phase of division.

3 Claims, 3 Drawing Sheets

CIRCUIT FOR DETECTING SYNCHRONIZING CODE

BACKGROUND OF THE INVENTION

The present invention relates to a circuit for detecting a synchronizing pattern from a code series containing a synchronizing code, and it relates particularly to a synchronizing code detection circuit operating at a low rate of 1/I, I being an integer, of an original bit rate.

When digital codes are transmitted or recorded, a synchronizing code is transmitted or recorded in addition to data so as to facilitate the processing on the reception side. The synchronizing code has a code pattern which is hard to be generated in the data, and based on the synchronizing pattern detected, the data transmitted or recorded bit by bit are converted into a parallel code series word by word or a code block comprising a plurality of words, for instance, on the reception side.

The detection of the synchronizing pattern has been conducted by such a known method to be described below, as is described in the Official Gazettes on Japanese Patent Laid-Open No. 111352/1981 and Japanese Patent Publication No. 2230/1982, for instance.

Assuming that the synchronizing code consists of l bits, received codes are brought into an l bit-shift register, and it is decided whether l bits of the output thereof correspond to the synchronizing pattern, while shifting is conducted by one bit. In other words, this method necessitates a shift register and a correspondence detection circuit. These circuit elements are required naturally to operate at the same rate as that of the received codes.

This causes a problem that a power consumed and a heat generated by the necessary circuit elements are increased as the rate of codes is increased. When the shift register is desired to operate at a rate of about 100 Mb/s, for instance, an ECL (Emitter-Coupled Logic) device is necessitated, and a power consumed thereby is about 40 mW/gate. This power consumption is twenty times larger than that of a TTL (Transistor Transistor Logic) device operating at a low rate. In addition to a problem that packaging of a unit turns difficult, etc., this large power consumption makes it hard to prepare an LSI, etc.

The synchronizing code detection circuit of high rate has a number of problems as described above, and there has been no example in which these problems are settled by using low-rate circuit elements.

SUMMARY OF THE INVENTION

An object of the present invention is to furnish a circuit which detects the synchronizing pattern contained in a received code series at a lower operation rate than a code rate.

In the present invention, the operation rate is reduced to 1/n by dividing the received code series into code series, n in number (n is a positive integer), and the detection of the synchronizing pattern is conducted on the basis of the fact that an original synchronizing pattern is transformed into any of patterns of n kinds according to the phase of said division.

DETAILED DESCRIPTION OF PREFERRED EMBODIMENT

An embodiment of the present invention will be described hereunder by using the drawings. FIG. 1A shows that an original code series X is received bit by bit. A synchronizing pattern is contained therein together with ordinary data, and it is assumed, in this case, that the synchronizing pattern is constituted by 16 bits comprising $a_i$, $b_i$, $c_i$ and $d_i$ ($i=1, \ldots, 4$). Now, consideration is given to a case in which said code series is divided into four code series A, B, C and D whose rate is ¼ of the original. There are cases of four kinds, I, II, III and IV, according to the phase of division, as shown in FIGS. 1B to 1E. It is determined by the initial state of a ¼ counter employed, however, which of the four cases I to IV is taken by the phase of division, and this is unknown at the time point of the division.

It is seen from FIG. 1B that $a_i$ is contained in A, $b_i$ in B, $c_i$ in C and $d_i$ in D ($i=1, \ldots, 4$) in the case of I, but the relationships of correspondence of A, B, C and D with $a_i$, $b_i$, $c_i$ and $d_i$ are shifted by one sequentially in the cases of II, III and IV as shown in FIGS. 1C to 1D. In other words, $b_i$ is contained in A, $c_i$ in B, $d_i$ in C and $a_i$ in D in II; $c_i$ is contained in A, $d_i$ in B, $a_i$ in C and $b_i$ in D in III; and $d_i$ is contained in A, $a_i$ in B, $b_i$ in C and $c_i$ in D in IV. When a code series comprising $a_i$, $b_i$, $c_i$ and $d_i$ in a round is considered, the code series contained in A, B, C and D in the cases of II, III and IV are nothing but those obtained by rotating the code series contained in A, B, C and D in the case of I, one by one sequentially.

It is also apparent from the figures that, while the phases of $a_1$, $b_1$, $c_1$ and $d_1$ are uniform in I, the phase of $d_1$ is shifted from that of $a_1$ in II, from those of $a_1$ and $b_1$ in III and from those of $a_1$, $b_1$ and $c_1$ in IV and the number of code series wherefrom $d_1$ is shifted increases one by one in II, III and IV in this sequence.

It is determined primarily in this way in what sequence the original synchronizing pattern is generated in A, B, C and D in each of the cases of I, II, III and IV. This means that a synchronizing pattern can be detected in any case of divisions of I to IV, if a function to detect four kinds of synchronizing patterns which can be generated in I to IV, is provided. In addition, it can be determined from a detected one of said synchronizing patterns of four kinds which of the cases of I to IV is taken by the phase of division.

Figure 2:
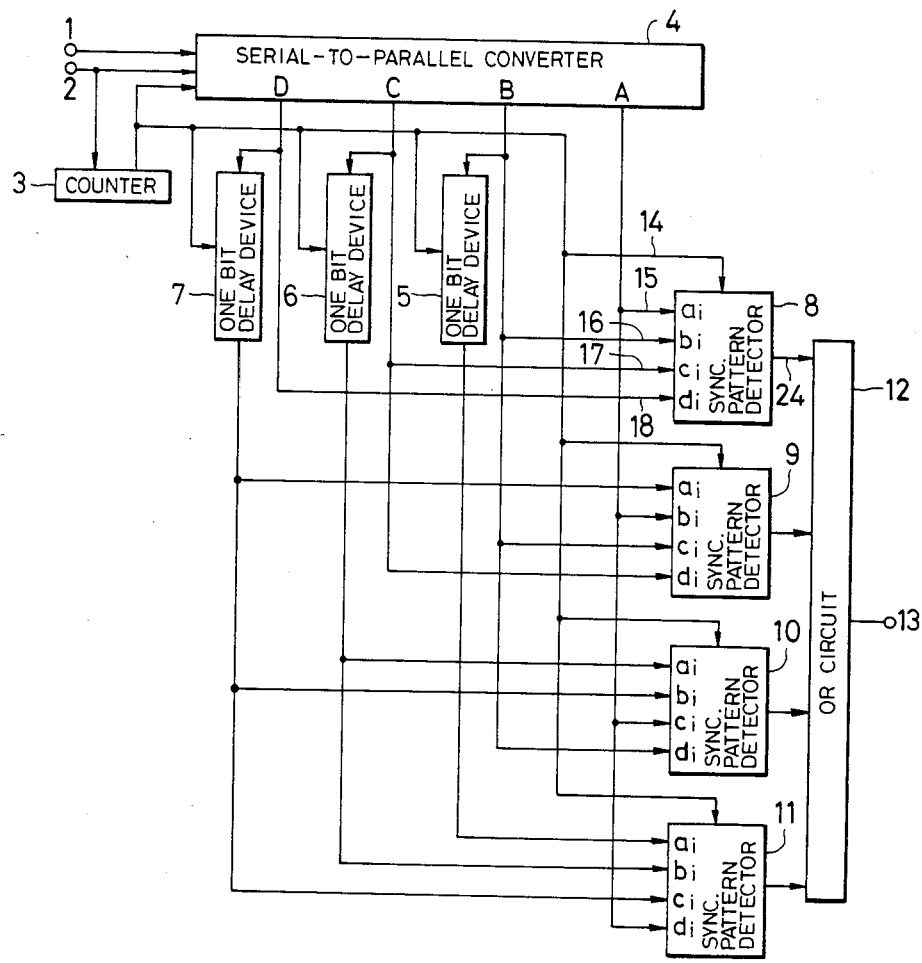
FIGS. 2, 3 and 4 show the principal part of one embodiment of the present invention and circuits accompanying the same, respectively.

A circuit in accordance with the present invention is shown in FIG. 2.

Input terminals 1 and 2 are given code series received and a clock pulse therefor. The clock pulse is transformed into a clock pulse having a frequency of ¼ of that of the original clock pulse by a counter 3. Numeral 4 denotes a 4 bit-serial-parallel converter wherefrom the code series inputted from the input terminal 1 is delivered simultaneously by every four bits to output terminals A, B, C and D.

There are four cases of I to IV of FIGS. 1B to 1E in the input-output relationship in the serial-parallel converter on the occasion. Which of these cases occurs is dependent on the initial state of the counter 3.

Numerals 5, 6 and 7 denote 1 bit delay devices which delay the outputs B, C and D of the serial-parallel converter 4 for a time period equivalent to one clock pulse by using an output clock pulse of the counter 3.

Numerals 8, 9, 10 and 11 denote synchronizing pattern detection circuits which determine whether $a_i$, $b_i$, $c_i$ and $d_i$ ($i=1, \ldots, 4$) are present at four inputs. These synchronizing pattern detection circuits have the same constructions, the detail of which will be described later.

The inputs of the synchronizing pattern detection circuit 8 are A, B, C and D, and this circuit detects the synchronizing pattern obtained in the case of I of FIG. 1B. The inputs of the circuit 9 are D delayed by one clock pulse, and A, B and C, and it detects the synchronizing pattern obtained in the case of II of FIG. 1C. The circuits 10 and 11 detect, likewise, the synchronizing patterns obtained in the cases of III and IV of FIGS. 1D and 1E. In other words, the synchronizing pattern detection circuit 8 detects the synchronizing pattern of "$a_i$, $b_i$, $c_i$, $d_i$", while the synchronizing pattern detection circuits 9, 10 and 11 detect the synchronizing patterns of "$b_i$, $c_i$, $d_i$, $a_i$", "$c_i$, $d_i$, $a_i$, $b_i$" and "$d_i$, $a_i$, $b_i$, $c_i$" which are obtained by rotating the synchronizing pattern of the circuit 8 one by one sequentially.

Although it is indefinite and dependent on the initial state of the counter 3 to which of the cases of I to IV the serial-parallel conversion corresponds, the synchronizing pattern is detected without fail by any one of the synchronizing pattern detection circuits 8, 9, 10 and 11. Therefore, a synchronizing code shown by Y in FIGS. 1B to 1E is obtained at an output 13 when the logical sum (OR) of the outputs of the circuits 8, 9, 10 and 11 is found by an OR circuit 12.

Figure 3:
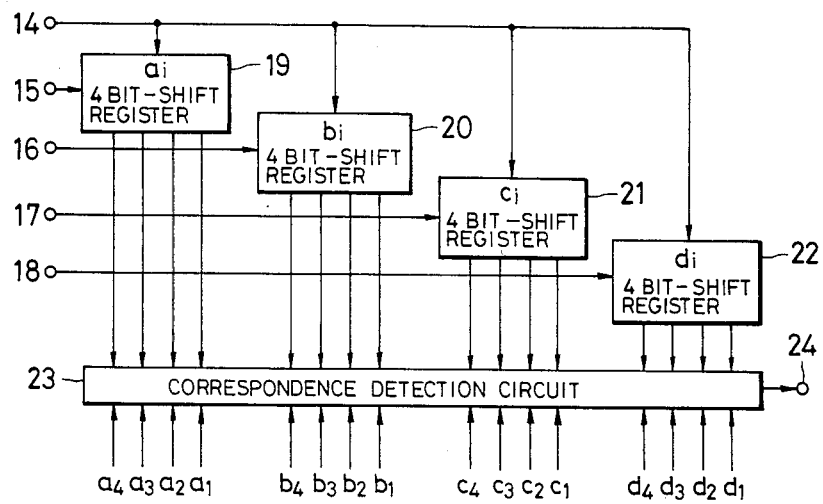

FIG. 3 shows a detailed embodiment of one of the synchronizing pattern detection circuits 8, 9, 10 and 11.

A terminal 14 receives the output clock pulse of the counter 3, while terminals 15, 16, 17 and 18 receive the output code series of the serial-parallel converter 4 or the 1 bit delay devices 5, 6 and 7. Numerals 19, 20, 21 and 22 denote 4 bit-shift registers which are made to operate by the clock pulse of the terminal 14. Numeral 23 denotes a correspondence detection circuit, which delivers a pulse to a terminal 24 only when the outputs of the shift registers 19, 20, 21 and 22 correspond to $a_i$, $b_i$, $c_i$ and $d_i$ ($i=1, \ldots, 4$) respectively. In other words, the synchronizing code is obtained at the time shown by Y in correspondence to each of the cases of I to IV of FIGS. 1B to 1E.

Figure 4:
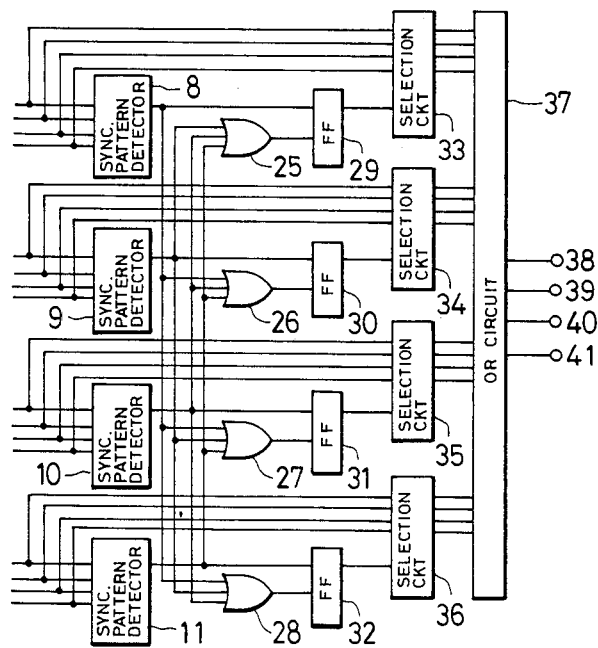

FIG. 4 shows an embodiment of a circuit which divides a received code series into four code series in accordance with a detected synchronizing pattern. In this figure, synchronizing pattern detection circuits 8, 9, 10 and 11 and the input states thereof are identical with those shown in FIG. 2.

Figure 1:
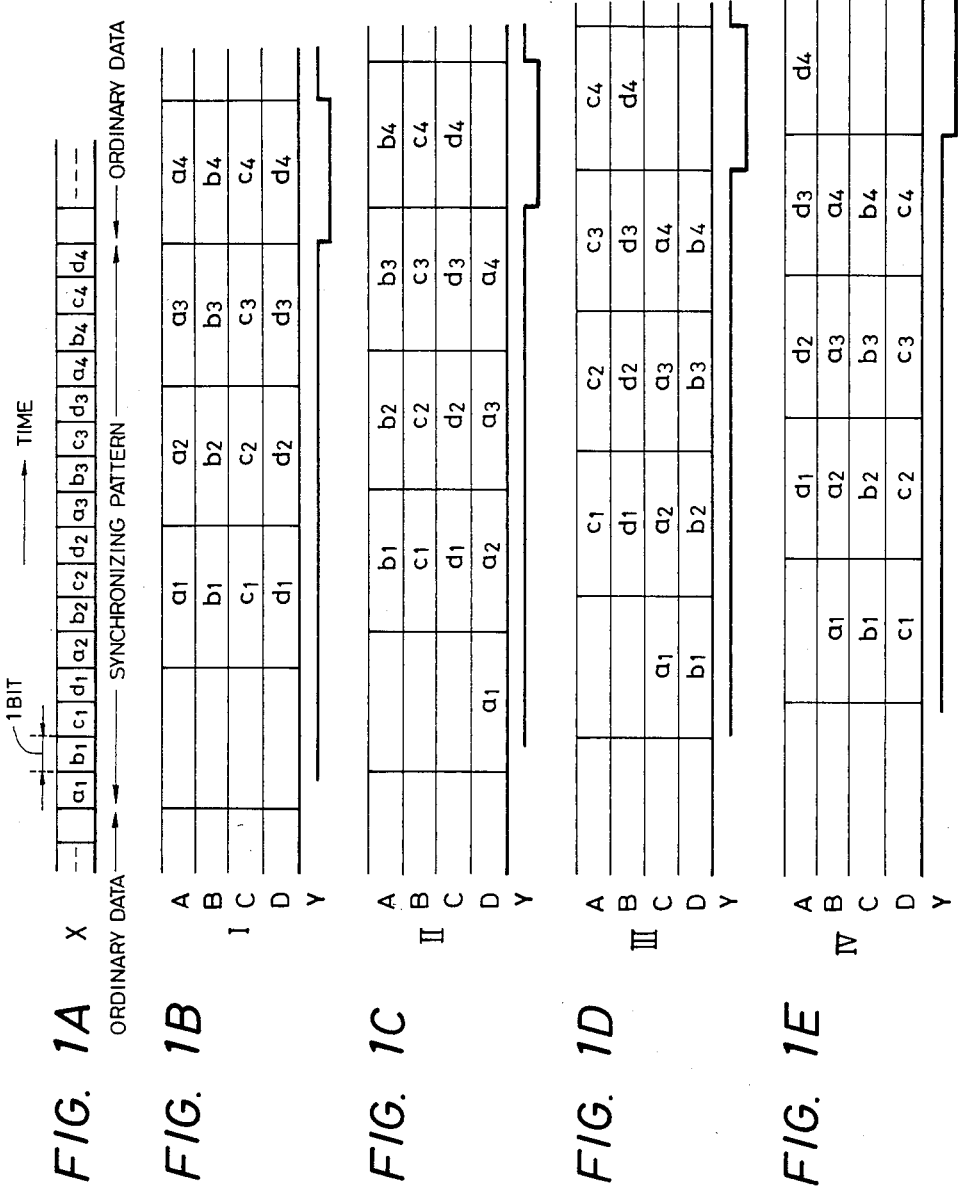
FIGS. 1A–1E show the principle of the present invention.

Numeral 29 denotes a flip-flop, which shows "1" when a pulse indicated by Y in FIG. 1 is obtained in the synchronizing pattern detection circuit 8, while showing "0" when the pulse indicated by Y in FIG. 1 is obtained in any of the synchronizing pattern detection circuits 9, 10 and 11. 25 denotes logical sum (OR) circuits. Numeral 33 denotes a selection circuit which delivers the input code series of the synchronizing pattern detection circuit 8 only when the output of the flip-flop 29 is "1". OR circuits 26, 27 and 28, flip-flops 30, 31 and 32, and selection circuits 34, 35 and 36, operate in the same manner as the above. Numeral 37 denotes a logical sum (OR) circuit. When a synchronizing pattern is detected in any of the synchronizing pattern detection circuits 8, 9, 10 and 11, the input code series of this synchronizing pattern detection circuit is obtained at output terminals 38 to 41 until another synchronizing pattern is detected thereafter.

When a power source of the circuit is applied and the state of the counter 3 is fixed, the state of division is set to any one of I to IV, and generally this is not varied thereafter. Accordingly, the flip-flops 29 to 32 do not need to be reset to "0" once they are set to "1". It may happen, however, that the flip-flops are set falsely to "1" due to noise and the like, and therefore such a consideration is given to the construction of FIG. 4 that, when any one of the flip-flops is set to "1", the remainders are reset to "0".

As the result, the same code series with the code series A to D in the case of FIG. 1B can always be obtained at the output terminals 38 to 41 regardless of the initial state of the counter 3.

According to the present embodiment, only the counter 3 and the serial-parallel converter 4 operate at the same rate as a received code series, and all of the other devices in FIGS. 2, 3 and 4 operate at the rate of ¼ of that of the received code series. Assuming that the rate of the received code series is 100 Mb/s, for instance, only the devices 3 and 4 require ECL devices, while TTL devices can be used for the other devices, since the operation rate thereof is 25 Mb/s. Consequently, a power consumed and a heat generated by these devices can be reduced sharply.

Moreover, the present embodiment has an effect that the detection of the synchronizing code and the serial-parallel conversion of received codes based on this detection can be realized simultaneously.

The present invention relates to the case in which the rate of a received code series is changed to ¼. This example can be expanded easily to any case in which the rate is changed to a fraction of an arbitrary integer. Although a circuit scale integral times as large as the above is needed in this case, the reduction of the operation rate enables the employment of a CMOS (Complementary Metal-Oxide Semiconductor), the easy realization of LSI, etc.

The present invention has an effect that a synchronizing pattern contained in the received code series can be detected at an operation rate lower than a bit rate of the received code series.

What is claimed is:

1. A synchronizing code detection circuit comprising:
    dividing means for dividing an original code series containing a synchronizing code into a code series, n in number, having a bit rate of 1/n of that of the original code series (n is a positive integer);
    delay means for delaying a code series, (n−m) in number, (m is a positive integer ranging from 1 to n) out of the code series, n in number, delivered from said dividing means, for a time equivalent to one time-slot of said bit rate of 1/n, respectively; and
    synchronizing pattern detecting means for detecting a pattern corresponding to any one of synchronizing patterns of n kinds obtained by rotating an original synchronizing pattern, from code series groups in n kinds comprising code series, m in number, out of the ones, n in number, delivered from said dividing means and code series, (n−m) in number, delivered from said delay means.

2. A synchronizing code detection circuit comprising:

a serial-parallel converter which divides an original code series containing a synchronizing code into a code series, n in number (n is a positive integer) having a bit rate of 1/n of that of the original code series;

a plurality of delay devices which delay a code series, (n−m) in number, (m is a positive integer ranging from 1 to n) out of the code series, n in number, delivered from said serial-parallel converter, respectively, for a time equivalent to one time-slot of said bit rate of 1/n;

a plurality of synchronizing pattern detection circuits which detect a pattern corresponding to any one of synchronizing patterns of n kinds obtained by rotating an original synchronizing pattern, respectively, from code series groups on n kinds comprising code series, m in number, out of the ones, n in number, delivered from said serial-parallel converter and code series, (n−m) in number, delivered from said delay devices respectively; and an output circuit which delivers an output of any one of said synchronizing pattern detection circuits.

3. A synchronizing code detection circuit comprising:

a serial-parallel converter which divides an original code series containing a synchronizing code into a code series, n in number, (n is a positive integer) having a bit rate of 1/n of that of the original code series;

a plurality of delay devices which delay a code series, (n−m) in number, (m is a positive integer ranging from 1 to n) out of the code series, n in number, delivered from said serial-parallel converter, respectively, for a time equivalent to one time-slot of said bit rate of 1/n;

a plurality of synchronizing pattern detection circuits which detect a pattern corresponding to any one of synchronizing patterns of n kinds obtained by rotating an original synchronizing pattern, respectively, from code series groups of n kinds comprising code series, m in number, out of the ones, n in number, delivered from said serial-parallel converter and code series, (n−m) in number, delivered from said delay devices respectively; and a logical sum circuit which delivers an output of any one of said synchronizing pattern detection circuits.

* * * * *